United States Patent
Kennedy et al.

(10) Patent No.: US 11,091,132 B2
(45) Date of Patent: Aug. 17, 2021

(54) DELAY AUTONOMOUS BRAKING ACTIVATION DUE TO POTENTIAL FORWARD TURNING VEHICLE

(71) Applicant: Bendix Commercial Vehicle Systems, LLC, Elyria, OH (US)

(72) Inventors: Andrew L. Kennedy, Lakewood, OH (US); Jeffrey M. Carbaugh, Avon Lake, OH (US); Nicholas A. Broyles, North Ridgeville, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 157 days.

(21) Appl. No.: 16/382,404

(22) Filed: Apr. 12, 2019

(65) Prior Publication Data

US 2020/0324743 A1  Oct. 15, 2020

(51) Int. Cl.
  *B60T 7/22* (2006.01)
  *B60T 8/174* (2006.01)
  *B60Q 9/00* (2006.01)

(52) U.S. Cl.
  CPC .............. *B60T 7/22* (2013.01); *B60Q 9/008* (2013.01); *B60T 8/174* (2013.01)

(58) Field of Classification Search
  CPC ............ B60T 8/174; B60T 7/22; B60Q 9/008
  See application file for complete search history.

(56) References Cited

U.S. PATENT DOCUMENTS

| 5,631,639 A | 5/1997 | Hibino et al. |
| 6,084,508 A | 7/2000 | Mai et al. |
| (Continued) | | |

FOREIGN PATENT DOCUMENTS

| CN | 204432641 U | 7/2015 |
| CN | 106740769 A | 5/2017 |
| (Continued) | | |

OTHER PUBLICATIONS

International Search Report (PCT/ISA/220 & PCT/ISA/210) issued in PCT Application No. PCT/US2020/027260 dated Jun. 25, 2020 (three pages).

(Continued)

*Primary Examiner* — Behrang Badii
*Assistant Examiner* — Daniel L Greene
(74) *Attorney, Agent, or Firm* — Crowell & Moring LLP

(57) ABSTRACT

A method and controller are provided for delaying activation of autonomous emergency braking of a host vehicle, based on a determination that autonomous emergency braking is not needed because a forward vehicle in front of the host vehicle is turning out of the path of the host vehicle. The controller receives inputs from sensors arranged on the host vehicle and includes a processor for determining whether and when to activate autonomous emergency braking. The processor includes control logic that determines whether a forward vehicle is present in front of the host vehicle and whether the forward vehicle is expected to turn out of a path of the host vehicle prior to the host vehicle reaching a current position of the forward vehicle. Based on the inputs from the sensors, the control logic determines whether to delay activation of the autonomous emergency braking of the host vehicle for a time value.

24 Claims, 3 Drawing Sheets

(56) References Cited

U.S. PATENT DOCUMENTS

| | | |
|---|---|---|
| 7,425,043 B2 | 9/2008 | Doerr et al. |
| 7,894,959 B2 | 2/2011 | Bernzen et al. |
| 8,712,674 B2 | 4/2014 | Maruyama |
| 9,074,536 B2 | 7/2015 | Schwindt |
| 9,187,091 B2 | 11/2015 | Mills |
| 9,260,059 B2 | 2/2016 | Rayes et al. |
| 9,318,020 B2 | 4/2016 | Salomonsson et al. |
| 9,586,581 B2 | 3/2017 | Strauss et al. |
| 9,613,280 B2 | 4/2017 | Kim |
| 9,701,307 B1 | 7/2017 | Newman et al. |
| 9,925,963 B2 | 3/2018 | Lee |
| 2005/0156727 A1 | 7/2005 | Golder |
| 2005/0195383 A1* | 9/2005 | Breed ............... B60N 2/28 356/4.01 |
| 2005/0278098 A1* | 12/2005 | Breed ............... G01S 13/931 701/45 |
| 2010/0280726 A1 | 11/2010 | Stabrey |
| 2012/0310480 A1 | 12/2012 | Schmidt |
| 2013/0226402 A1 | 8/2013 | Tsuruta et al. |
| 2014/0025270 A1 | 1/2014 | Kosanam et al. |
| 2015/0081188 A1 | 3/2015 | Kornhaas |
| 2015/0151742 A1 | 6/2015 | Clarke et al. |
| 2015/0253416 A1 | 9/2015 | Kim |
| 2016/0272172 A1 | 9/2016 | Lee |
| 2017/0334483 A1* | 11/2017 | Schiebahn .......... G08G 1/165 |
| 2017/0364070 A1 | 12/2017 | Oba |
| 2018/0170215 A1* | 6/2018 | Yetukuri ........... B60N 2/0276 |
| 2018/0312172 A1 | 11/2018 | Nohl et al. |

FOREIGN PATENT DOCUMENTS

| | | |
|---|---|---|
| DE | 10 2005 055 208 A1 | 2/2007 |
| DE | 10 2010 022 706 A1 | 12/2011 |
| DE | 10 2014 004 739 A1 | 9/2014 |
| DE | 10 2014 203 806 A1 | 9/2015 |
| EP | 2 783 928 A1 | 10/2014 |
| EP | 3 079 959 B1 | 11/2017 |
| EP | 2 620 314 B1 | 3/2018 |
| EP | 2 750 943 B1 | 3/2018 |
| JP | 2016-115356 A | 6/2016 |
| WO | WO 2009/109244 A2 | 9/2009 |
| WO | WO 2017/067929 A1 | 4/2017 |
| WO | WO 2017/220175 A1 | 12/2017 |
| WO | WO 2018/135869 A1 | 7/2018 |

OTHER PUBLICATIONS

Written Opinion (PCT/ISA/237) issued in PCT Application No. PCT/US2020/027260 dated Jun. 25, 2020 (10 pages).

Rosen, E., "Autonomous Emergency Braking for Vulnerable Road Users", IRCOBI Conference 2013, pp. 618-627 (10 pages).

Cover page of EP 3 365 212 A1 published Aug. 29, 2018 (one (1) page).

"Automatic Emergency Braking Systems (AEBS)", GRRF Informal Group on Automatic Emergency Braking and Lane Departure Warning Systems, Jun. 2009, NTSEL (42 pages).

Nyland, "V8.0 automatic braking with two cars in front", https://www.youtube.com/watch?v=cG3Jp5GyPoc Oct. 16, 2016.

* cited by examiner

DELAY AUTONOMOUS BRAKING ACTIVATION DUE TO POTENTIAL FORWARD TURNING VEHICLE

BACKGROUND AND SUMMARY OF THE INVENTION

The present invention relates to a control system for autonomous emergency braking of a vehicle. In particular, the present invention relates to a method and a controller for a vehicle system on a host vehicle that delays the activation of autonomous emergency braking when it is determined that a forward vehicle in front the host vehicle is turning out of the path of the host vehicle.

Conventional autonomous emergency braking (AEB) systems determine when to activate emergency braking based on whether an obstacle such as another vehicle is present in the path of the host vehicle and whether the host vehicle needs to begin braking in order to avoid a collision with the obstacle. If these determinations are positive and the driver has not already initiated a braking action, the AEB system activates emergency braking to slow the host vehicle. Conventional AEB systems, however, do not consider whether the obstacle is likely to leave the path of the host vehicle, in which case the activation of emergency braking may be delayed or unnecessary.

In a typical vehicle turning operation at an intersection or driveway, the vehicle operator will decelerate their vehicle to an appropriate turning speed before performing the turn. When the turning vehicle is a forward vehicle in front of a host vehicle, the operator of the host vehicle may recognize that the forward vehicle is decelerating because it is going to turn off the road on which the vehicles are traveling. In this case the operator of the host vehicle may choose to not decelerate to match the speed of the forward vehicle, since the forward vehicle is likely to have already completed the turn and will no longer be obstructing the road in front of the host vehicle when the host vehicle reaches the location of the forward vehicle. However, if the host vehicle is equipped with a conventional AEB system, the conventional AEB system is not aware that the forward vehicle is making a turn and is not likely to remain an obstacle in front of the host vehicle, and thus the conventional AEB system will recognize the forward vehicle as a potential forward collision threat and activate an audible and/or visual warning and/or an emergency braking of the host vehicle. In these situations, autonomous emergency braking can be an unnecessary annoyance to the vehicle operator who may be aware of the obstacle and its movement out of the path of the host vehicle.

In order to avoid unnecessary activation of autonomous emergency braking, the present invention makes a determination of whether a forward vehicle in front of the host vehicle is making a turn out of the path of the host vehicle such that activation of emergency braking can be delayed and avoided. When it is determined that the forward vehicle is likely to move out of the path of the host vehicle, such as by making a turn off the road on which the vehicles are traveling, the activation of the autonomous emergency braking is delayed by a time value. Accordingly, an unnecessary activation of the autonomous emergency braking is avoided, which improves the vehicle operator's satisfaction and the operational efficiency of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
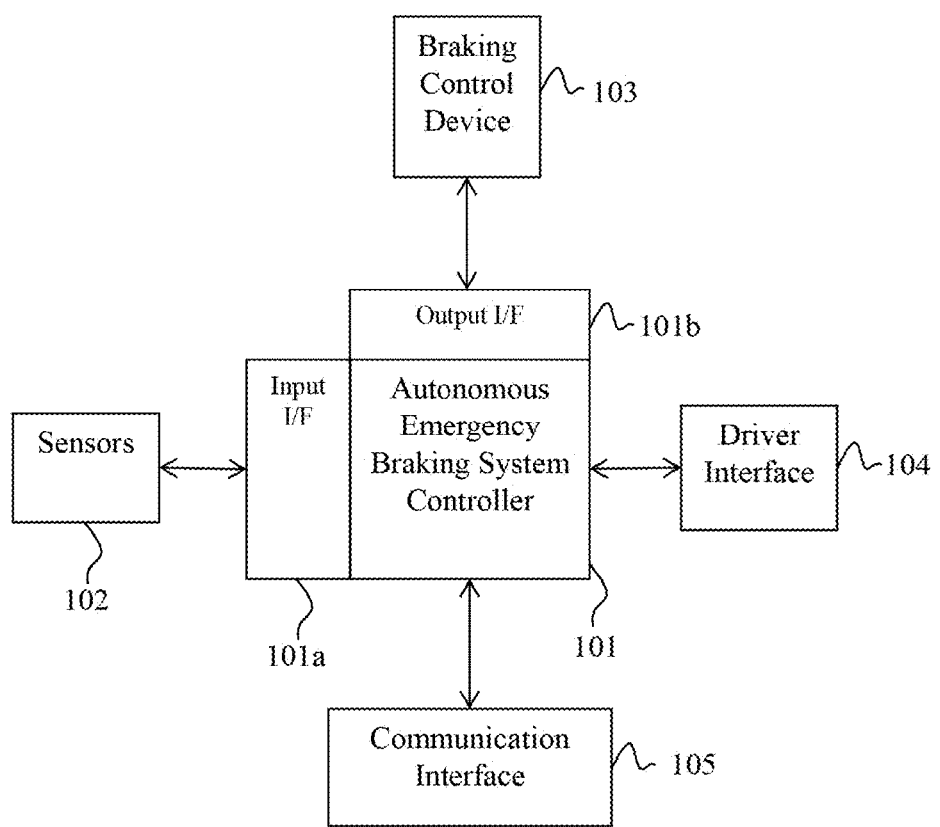
FIG. 1 illustrates a schematic block diagram of a vehicle system of a host vehicle according to an exemplary embodiment of the present invention.

FIG. 1 illustrates a schematic block diagram of a vehicle system of a host vehicle according to an exemplary embodiment of the present invention. The vehicle system illustrated in FIG. 1 includes an autonomous emergency braking (AEB) system, which includes an autonomous emergency braking (AEB) system controller 101, one or more sensors 102, a braking control device 103, a driver interface 104, and a communication interface 105. Although FIG. 1 illustrates direct connections between the parts of the vehicle system for clarity, the various parts of the vehicle system can communicate with each other via a communication network or a communication bus, such as a Controller Area Network (CAN) bus.

The sensors 102 can include, for example, one or more of a camera, a radar, and a lidar arranged on the host vehicle for detecting signals from a forward vehicle in front of the host vehicle and an area in the vicinity of the host vehicle and the forward vehicle. The sensors 102 can be used to gather images of the forward vehicle and structural features in the vicinity of the forward vehicle, such as intersections on a road, driveways, and road barriers and markings (e.g., curbs, lane lines, etc.). The images of the forward vehicle can be used to determine whether a turn indicator light (blinker) of the forward vehicle is activated, which indicates that the forward vehicle is likely to turn off the road on which it is traveling, such that the forward vehicle will move out of the path of the host vehicle. Also, the sensors 102 can be used to determine the speed of the forward vehicle and whether the forward vehicle is decelerating, which provides another indication that the forward vehicle is likely to turn and leave the road on which it is currently traveling.

The AEB system controller 101 includes a processor having control logic that receives inputs from the sensors 102 via input interface 101a and outputs brake control signals to the braking control device 103 via the output interface 101b. The input and output interfaces 101a and 101b can be any kind of wired or wireless connections used by the AEB system controller 101 to connect to the sensors 102 and the braking control device 103. Upon receiving a brake control signal, the braking control device 103 activates the vehicle brakes to slow or stop the vehicle.

The operator of the vehicle is provided with a driver interface 104, through which the AEB system controller 101 can communicate with the operator. For example, the AEB system controller 101 can provide the operator with a plurality of visual, text, and audible indicators and alerts via the driver interface 104. These indicators and alerts can include warnings about forward vehicles and other obstacles in the path of the host vehicle that represent a forward collision threat to the host vehicle. The vehicle system illustrated in FIG. 1 also includes a communication interface 105 for communicating with other vehicle systems and systems outside of the vehicle.

Figure 2:
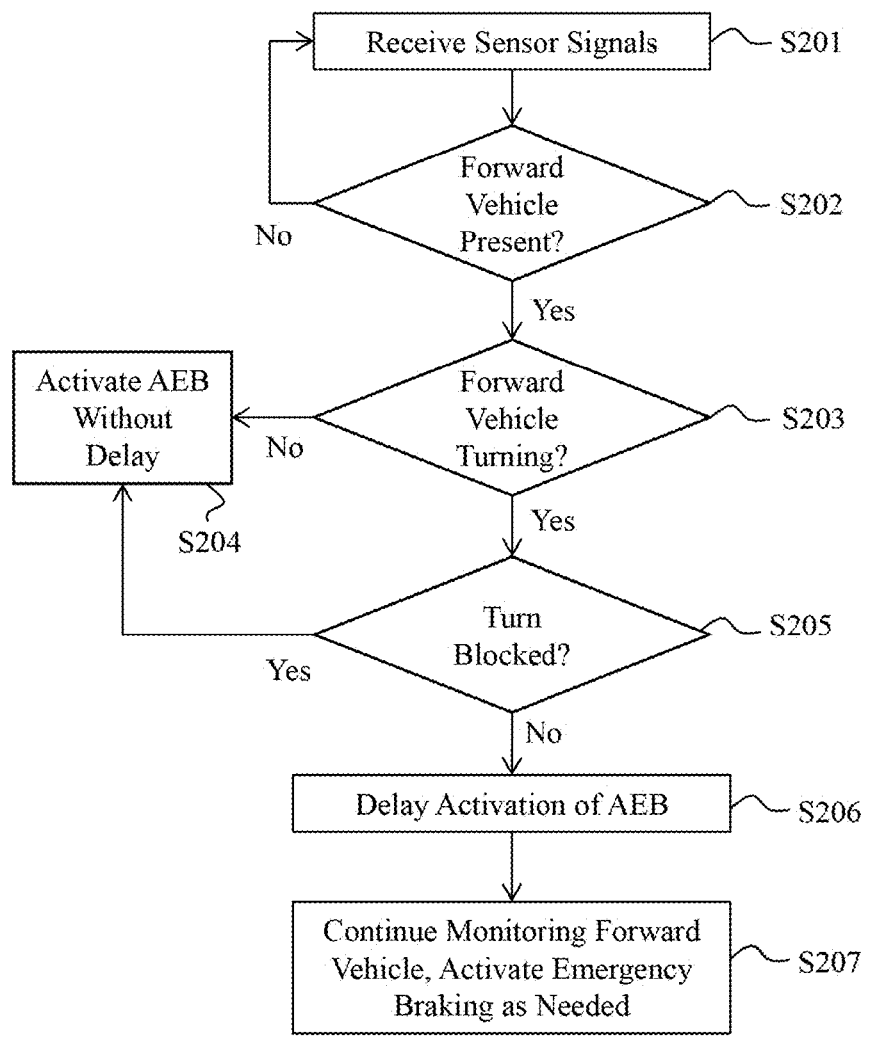
FIG. 2 illustrates a method for controlling a vehicle system of a host vehicle according to an exemplary embodiment of the present invention.

FIG. 2 illustrates a method for controlling a vehicle system of a host vehicle according to an exemplary embodiment of the present invention. In accordance with the method, the AEB system controller 101 receives signals from sensors 102 arranged on the host vehicle for identifying the presence and location of a forward vehicle and other obstacles in or near the path of the host vehicle. Although the obstacle in front of the host vehicle can be something other than a forward vehicle, for the sake of clarity and simplicity, the following description will only refer to a forward vehicle.

The sensors 102 can include cameras, radar devices, and lidar devices for obtaining images, distances, angles, locations and velocities, for example, of the forward vehicle and other obstacles near the path of the host vehicle. In step S201 of FIG. 2, the AEB system controller 101 receives signals from the sensors 102. Based on the received signals, the processor in the AEB system controller 101 determines in step S202 whether a forward vehicle is in front of the host vehicle and is target for continued monitoring by the AEB system controller. If no forward vehicle is located in the path of the host vehicle or the forward vehicle is determined to not be a collision threat to the host vehicle, the host vehicle continues operation without any intervention by the AEB system and continues to receive sensor signals. Although a return to step S201 for receiving sensor signals is only illustrated at step S202, it is to be understood that the sensors 102 continue to obtain images, distances, angles, velocities and the like of the forward vehicle, and the AEB system controller 101 continues to receive updated signals throughout the operation of the host vehicle.

If it is determined in step S202 that a forward vehicle is present in front of the host vehicle, a determination is made in step S203 of whether the forward vehicle is turning, which would result in the forward vehicle leaving the path of the host vehicle. After the forward vehicle completes its turn, the forward vehicle no longer represents a threat of a forward collision. The AEB system controller 101 makes this determination by analyzing the signals received from the sensors 102, wherein the signals can represent images of the forward vehicle and structural features in the vicinity of the forward vehicle, such as intersections on a road, driveways, and road barriers and markings (e.g., curbs, lane lines, etc.). The images of the forward vehicle can be used to determine whether a turn indicator light (blinker) of the forward vehicle is activated, which indicates that the forward vehicle is likely to turn off the road on which it is traveling. Also, the sensors 102 (e.g., radar and lidar) can be used to determine the speed of the forward vehicle and whether the forward vehicle is decelerating. This provides another indication that the forward vehicle is likely to turn and leave the road on which it is currently traveling. Additionally, the AEB system controller 101 can receive GPS signals from a GPS-based mapping system in the host vehicle, which provide another source of road information, such as upcoming intersections, which can be used in conjunction with the sensor signals to determine whether the forward vehicle is turning.

Alternatively, an algorithm can be implemented in the AEB system controller 101 to indicate the likelihood of turning using all of the inputs available. For example, a side road detection, a break in a road barrier detection, a forward vehicle turn signal detection, and the forward vehicle's lateral position and lateral acceleration relative to the host vehicle can be received by the AEB system controller 101 and based on the received inputs a likelihood of the forward vehicle making a turn out of the path of the host vehicle can be determined. The likelihood can be determined based on any desired combination of positive detection results from the side road, road barrier, and turn signal detections and lateral position and acceleration information of the forward vehicle. The AEB system controller 101 can compare the determined likelihood to a threshold value to determine whether the forward vehicle is likely to turn. The threshold value can be predetermined or adjustable based on the detected signals in the vicinity of the host vehicle.

If it is determined in step S203 that the forward vehicle is not turning, then in step S204 the AEB system is activated without a delay to ensure that the host vehicle avoids a collision with the forward vehicle. On the other hand, if it is determined in step S203 that the forward vehicle is turning, then the AEB system controller 101 determines in step S205 whether a path of the forward vehicle is blocked by a pedestrian, vehicle or other obstacle 400. This determination can be made based on signals received from the sensors 102 that are obtained from the area in and near the path of the forward vehicle.

If it is determined in step S205 that the path of the forward vehicle is blocked, then the AEB system is activated without a delay in step S204. If the AEB system controller 101 determines in step S205 that the turn of the forward vehicle is not blocked, then in step S206 the AEB system controller 101 delays activation of the AEB system by a time value determined by at least one of a time to collision, a predetermined amount of time, a distance to the forward vehicle and a relative velocity to the forward vehicle. The audible and visual warning of AEB activation may also be delayed. Alternatively, the visual warning could be immediate upon detection of the forward vehicle as a potential collision threat, but the audible warning delayed. In an exemplary embodiment of the present invention, the time value is 0.5 seconds to 1 second, depending, for example, upon the distance between the host vehicle and the forward vehicle and the speed at which the host vehicle is approaching the forward vehicle. In alternative embodiments, however, the time value is less than 0.5 seconds or more than 1 second. As illustrated in step S207, the AEB system continues to monitor the forward vehicle and its path for any changes via sensors 102 and activates emergency braking as needed.

Figure 3A:
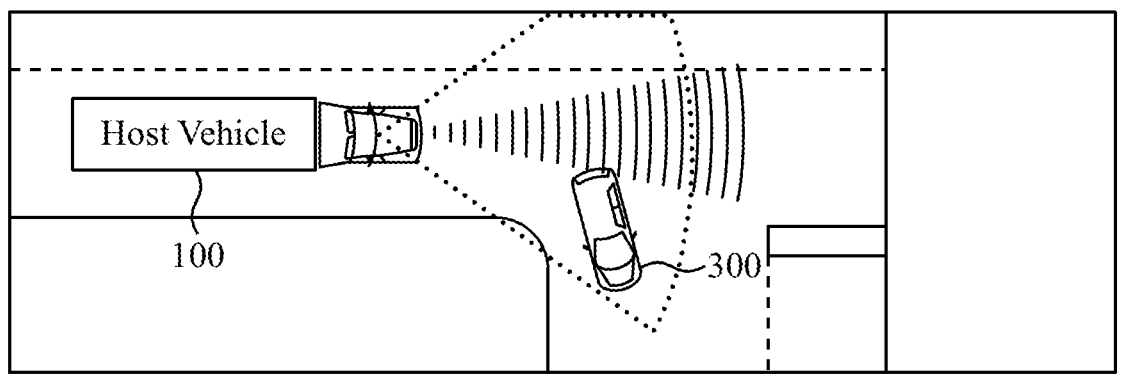
FIG. 3A illustrates a host vehicle detecting a forward vehicle that is making a turn in front of the host vehicle.
Figure 3B:
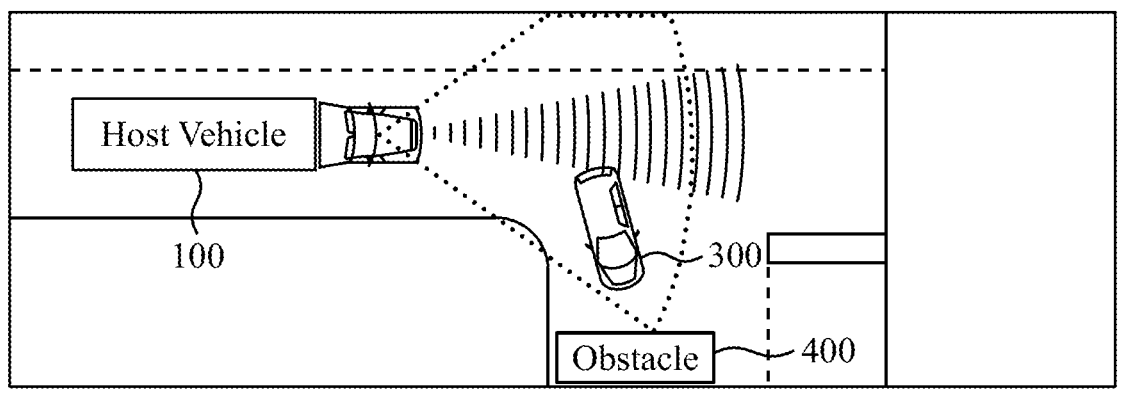
FIG. 3B illustrates a host vehicle detecting a forward vehicle that is making a turn in front of the host vehicle in a case in which the forward vehicle is blocked from making the turn by an obstacle in the path of the forward vehicle.

FIGS. 3A and 3B illustrate a host vehicle 100 detecting a forward vehicle 300 in front of the host vehicle 100 that is making a turn at an intersection of roads. FIG. 3B illustrates a case in which an obstacle 400 (e.g., vehicle or pedestrian) is blocking the forward vehicle 300 from making a turn. As described above, the sensors 102 arranged on the host vehicle may include, for example, a radar and a camera. In FIGS. 3A and 3B, the group of parallel lines in front of the host vehicle 100 represents a radar signal output by a radar device installed on the front of the host vehicle. The radar device may be installed on the front bumper of the host vehicle, but it is not limited to this location. The wider triangular shape in FIGS. 3A and 3B represents the view of a camera mounted on the host vehicle 100. Although the camera is illustrated as being mounted on or near the windshield of the host vehicle 100, this location is merely an example and the camera can be mounted in other locations on the host vehicle 100.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A controller for a vehicle system on a host vehicle, comprising:
   an input interface for receiving inputs from sensors arranged on the host vehicle;
   an output interface for outputting a braking signal to control autonomous emergency braking of the host vehicle; and
   a processor having control logic capable of:
   determining whether a forward vehicle is present in front of the host vehicle based on the inputs from the sensors;
   in a case in which the forward vehicle is determined to be present in front of the host vehicle, determining whether the forward vehicle is expected to turn out of a path of the host vehicle prior to the host vehicle reaching a current position of the forward vehicle based on the inputs from the sensors; and
   in a case in which the forward vehicle is expected to turn out of the path of the host vehicle prior to the host vehicle reaching the current position of the forward vehicle, delaying activation of the autonomous emergency braking of the host vehicle for a time value;
   wherein determining whether the forward vehicle is expected to turn out of the path of the host vehicle prior to the host vehicle reaching the current position of the forward vehicle includes at least one of determining whether the forward vehicle is decelerating and determining whether a break in a road barrier indicating an intersection or driveway is present.

2. The controller according to claim 1, wherein, in a case in which the forward vehicle is not expected to turn out of the path of the host vehicle, activating the autonomous emergency braking of the host vehicle without a delay.

3. The controller according to claim 1, wherein the sensors include at least one of a radar, a camera, and a lidar.

4. The controller according to claim 1, wherein the control logic is further capable of continuously receiving updated signals from the sensors and determining whether to activate the autonomous emergency braking based on the updated signals.

5. The controller according to claim 1, wherein the control logic is capable of delaying at least one of an audible warning and a visual warning in the case in which the forward vehicle is expected to turn out of the path of the host vehicle prior to the host vehicle reaching the current position of the forward vehicle.

6. The controller according to claim 1, wherein the control logic is further capable of determining whether a path of the forward vehicle to make the turn is blocked by an obstruction in the path of the forward vehicle based on the inputs from the sensors.

7. The controller according to claim 6, wherein, when the path of the forward vehicle is blocked by the obstruction, the autonomous emergency braking of the host vehicle is activated without a delay.

8. The controller according to claim 6, wherein, when the path of the forward vehicle is not blocked by the obstruction, the activation of the autonomous emergency braking of the host vehicle is delayed by the time value.

9. The controller according to claim 1, wherein determining whether the forward vehicle is expected to turn out of the path of the host vehicle prior to the host vehicle reaching the current position of the forward vehicle further includes determining whether a visual turn indicator of the forward vehicle is activated.

10. The controller according to claim 9, wherein determining whether the forward vehicle is expected to turn out of the path of the host vehicle prior to the host vehicle reaching the current position of the forward vehicle includes determining, based on GPS data, whether the forward vehicle is approaching an intersection.

11. The controller according to claim 1, wherein the time value is determined by at least one of a time to collision, a predetermined amount of time, a distance to the forward vehicle and a relative velocity to the forward vehicle.

12. The controller according to claim 11, wherein the predetermined amount of time is between 0.5 seconds and 1 second.

13. The method according to claim 12, further comprising:
   in a case in which the forward vehicle is not expected to turn out of the path of the host vehicle, activating the autonomous emergency braking of the host vehicle without a delay.

14. The method according to claim 12, further comprising:
   determining whether a path of the forward vehicle to make the turn is blocked by an obstruction in the path of the forward vehicle based on the inputs from the sensors.

15. The method according to claim 12, further comprising:
   continuously receiving updated signals from the sensors and determining whether to activate the autonomous emergency braking based on the updated signals.

16. The method according to claim 12, wherein determining whether the forward vehicle is expected to turn out of the path of the host vehicle prior to the host vehicle reaching the forward vehicle further includes determining whether a visual turn indicator of the forward vehicle is activated.

17. The method according to claim 12, wherein the predetermined amount of time is between 0.5 seconds and 1 second.

18. The method according to claim 12, wherein the sensors include at least one of a radar, a camera, and a lidar.

19. The method according to claim 18, wherein determining whether the forward vehicle is expected to turn out of the path of the host vehicle prior to the host vehicle reaching the forward vehicle includes determining, based on GPS data, whether the forward vehicle is approaching an intersection.

20. The method according to claim 12, wherein the time value is determined by at least one of a time to collision, a predetermined amount of time, a distance to the forward vehicle and a relative velocity to the forward vehicle.

21. The method according to claim 20, further comprising delaying at least one of an audible warning and a visual warning in the case in which the forward vehicle is expected to turn out of the path of the host vehicle prior to the host vehicle reaching the current position of the forward vehicle.

22. A method for controlling a vehicle system on a host vehicle, comprising:
   receiving inputs from sensors arranged on the host vehicle;
   determining whether a forward vehicle is present in front of the host vehicle based on the inputs from the sensors;
   in a case in which the forward vehicle is determined to be present in front of the host vehicle, determining whether the forward vehicle is expected to turn out of a path of the host vehicle prior to the host vehicle reaching a current position of the forward vehicle based on the inputs from the sensors; and in a case in which the forward vehicle is expected to turn out of the path of the host vehicle prior to the host vehicle reaching the current position of the forward vehicle, delaying activation of autonomous emergency braking of the host vehicle for a predetermined amount of time;

wherein determining whether the forward vehicle is expected to turn out of the path of the host vehicle prior to the host vehicle reaching the current position of the forward vehicle includes at least one of determining whether the forward vehicle is decelerating and determining whether a break in a road barrier indicating an intersection or driveway is present.

23. The method according to claim 22, wherein, when the path of the forward vehicle is blocked by the obstruction, the autonomous emergency braking of the host vehicle is activated without a delay.

24. The method according to claim 22, wherein, when the path of the forward vehicle is not blocked by the obstruction, the activation of the autonomous emergency braking of the host vehicle is delayed by the predetermined amount of time.

* * * * *